Oct. 25, 1960     J. W. BENTLEY     2,957,199
HAND OPERATED MEAT BALL MOLD
Filed Jan. 10, 1958

INVENTOR
JOHN W. BENTLEY
BY
Gardner + Zimmerman
ATTORNEYS

United States Patent Office 2,957,199
Patented Oct. 25, 1960

2,957,199
HAND OPERATED MEAT BALL MOLD
John W. Bentley, 363 Montalvin Drive, San Pablo, Calif.

Filed Jan. 10, 1958, Ser. No. 708,122

4 Claims. (Cl. 17—32)

This invention relates to hand operated food molds, and is more particularly directed towards a mold for compressing ground or chopped meat into balls of substantially uniform shape and density.

The forming of meat balls by use of the hands is generally accomplished by inserting the hands into a mass of ground meat, removing a portion therefrom and rolling the portion between the palms of the hands to give it a more or less spherical form. This is at best a time consuming and messy operation and usually the various balls so formed are neither of a uniform size or shape nor is the meat compressed throughout the ball to an equal degree. As a result, after the meat balls have been cooked, some of the balls will be more thoroughly cooked than others, and furthermore the individual ball will have unevenly cooked portions. Also, the method of handling the meat in the foregoing manner is undesirable from a sanitary standpoint.

Heretofore, various devices have been proposed for forming the meat balls so as to eliminate some of the objections aforesaid. However, the devices heretofore available for such use have been found to be unsatisfactory due to the fact, for example, that the meat receiving portions thereof are inconvenient or difficult to fill without the use of the hands and therefore without contact of the hands with the meat such devices cannot be relied upon to provide a completely filled mold. Furthermore, the composition of a meat ball mixture is usually such that in the raw state the balls are likely to stick to the inner surfaces of the mold whereby it is often difficult to release the balls from the mold without portions remaining in the mold and clinging to the walls thereof. It has likewise been found that the foregoing devices are generally difficult to clean for the reason that the meat will work into inaccessible corners and crevices usually present in such devices.

It is therefore an object of the present invention to provide a simple, easily operated kitchen tool of the character described which will insure the forming of meat balls consistently of uniform shape and density.

It is another object of this invention to provide a device of the character described in which the mold members of the device may be utilized as a scoop to withdraw a full charge of meat from a mass, fill the mold with the charge, compress the meat in the mold to the proper density, and form the same into the desired shape all without contact of the hands with the meat.

A further object of the invention is to provide a device of the character described in which the release and removal of the completed meat ball from the mold may be easily and readily effected without impairing its molded shape or allowing any portions to be separated.

A still further object of the invention is to provide a meat ball forming device which may be utilized for safely carrying the ball to and depositing it into the cooking vessel and readily removing the cooked meat ball from the vessel for serving.

The invention possesses other objects and features of advantage, some of which, with the foregoing, will be set forth in the following description of the preferred form of the invention which is illustrated in the drawing accompanying and forming part of the specification. It is to be understood, however, that variations in the showing made by the said drawing and description may be adopted within the scope of the invention as set forth in the claims.

Referring to said drawing.

Figure 1:
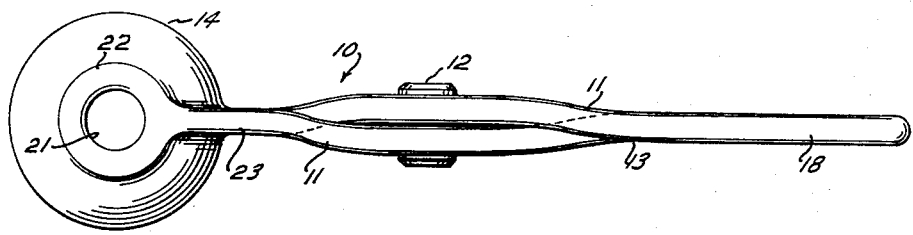
Figure 1 is a top plan view of a hand operated mold embodying this invention.
Figure 2:
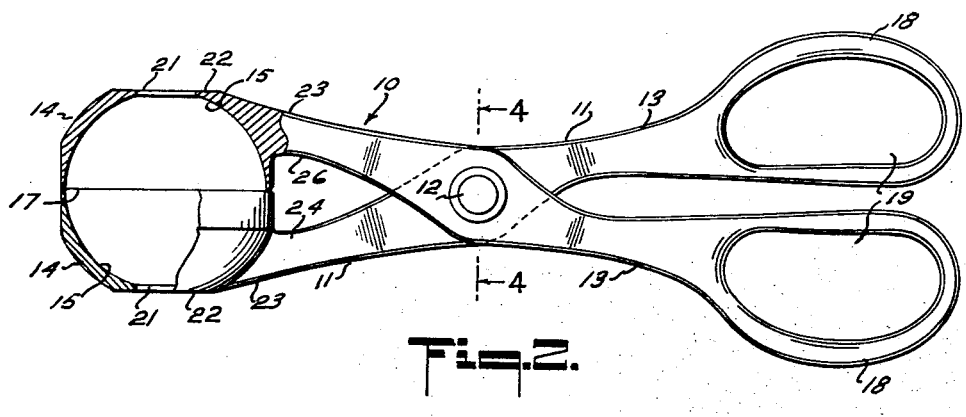
Figure 2 is a side elevational view of the mold, portions being broken away to more clearly illustrate the structure thereof.
Figure 4:
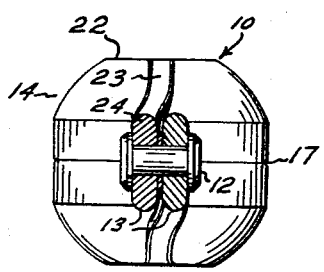
Figure 4 is a cross-sectional view taken substantially on the line 4—4 of Figure 2.
Figure 3:
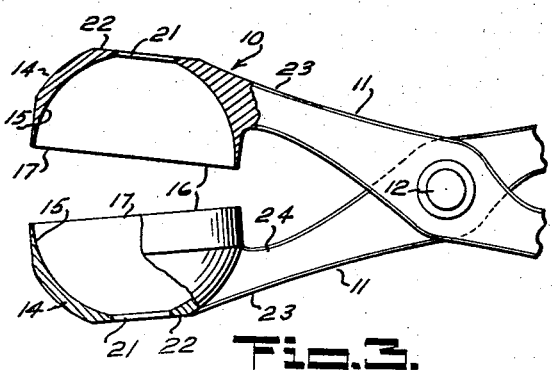
Figure 3 is a view similar to Figure 2 but showing the mold in open position.

Considering now the invention in detail and referring to the drawings there is shown a molding unit 10 adapted for hand operation and comprising a pair of tongs 11 each preferably of the same form and size and pivotally connected together intermediate their ends such as by means of a bolt 12. At one end of each of the tongs is provided a handle 13, while at the other end is formed a meat receiving and molding section 14. The sections are provided with semi-spherical cavities 15 having open sides 16 defined by circular edges 17 of the sections. The open sides of the cavities are in directly opposed relation and the sections are in such relation to the pivotal axis of the tongs that the edges 17 may be brought into full contact and registration. In such latter position, the sections will combine to provide a closed mold with a complete spherical cavity.

The handles 13 are formed as loops 18 which extend perpendicular to the plane defined by the edges 17. The loops provide openings 19 for receiving the fingers and thumb of the operator, and desirably the tongs cross each other at the pivotal axis so that in relation to the longitudinal center of the assembled tongs the mold section of each tong will lie at the side opposite to that on which the associated handle lies. In this manner the device may be readily operated to effect a separation or closing of the mold sections by corresponding movement of the handles.

It will be noted that the body of the mold sections is of generally the same contour as the surface of the mold cavities except that adjacent the edges 17 the outerside of the sections are flattened to form wall portions of gradually decreasing thickness and providing almost knife-like sharpness at said edges. When it is desired to introduce a charge into the mold cavities, the mold sections are placed in extended spaced relation and thrust into a mass of the product of which the balls are to be formed. Due to the form of the edge portions, as the sections are moved toward each other, the sections will serve as scoops to gather a charge of the product into the mold cavities, and further the thinned edges will function to readily sever the product in the mold from the exterior mass without compressing or unduly disturbing the latter. The edge portions 17 are also important in the final closing operation since on contact of the edges with each other, any portion of the product protruding from the mold cavities will be severed from the charge and allowed to drop back on the mass.

As an important feature of the invention, means are incorporated with the mold sections for preventing undue compression of the charge in the mold during the molding operation and the closing action of the sections. Formed in the mold sections, preferably at the base of the cavities, are apertures 21 which extend from the cavities to the exterior of the sections. By reason of such openings, if during the filling operation, more than the required amount of product is introduced into the mold cavities, the excess product will be expressed outwardly through the apertures while the sections are moved to closed position. In this connection it may be noted, that in the closing action of the sections, the product being molded is being forced toward the base of the cavities. It will thus be clear that due to the provision of the apertures, overpacking of the product will be prevented and no care is required to avoid overfilling of the mold. A further advantage of the apertures 21 is that at no time, that is either during or after the filling operation, will the air be prevented from escaping from the product or the mold cavity. This is important because products such as used for making meat balls are likely to have air pockets formed therein and more or less of the air will be expressed from the product during the molding process.

The size of the apertures 21 is such that enough product can escape therethrough to prevent the overpacking, and yet should not be so large as to prevent proper molding and firming of the product in the cavities. It has been found that with a spherical cavity of about two inches in diameter, an aperture of approximately one-half inch diameter is satisfactory.

Desirably the exterior surface portion 22 of the mold sections surrounding the apertures 21 is flattened so as to reduce to a minimum the depth of the apertures. In this way, no noticeable amount of the product will be contained in the apertures.

It will be noted that due to the flattened portions adjacent edges 17 and the apertures 21, any of the product clinging to the mold or extending outwardly therefrom may be readily removed by scraping off such excess with some instrument or on the rim of the receptacle in which the mass of product may be contained. It may also be noted that the exterior mold portions on opposite sides of each of the flattened areas referred to are formed to recede from such areas, thereby facilitating the scraping or removal of the excess material. In keeping with the foregoing, the outer edge 23 of the tong portions 24 adjoining the mold sections are also positioned inwardly of the plane of the flattened portions 22. Also the inner edge 26 of each of the tong portions 24 is positioned inwardly of the edge 17 at juncture of such portions with the sections, thus avoiding the probability of any of the excess product from the mold being lodged between the tong shank portions 24, and also permitting ready cleaning of such portions when the device is being washed.

Since the apertures 21 may also serve for admission of air, there will be no danger of any suction at the base of the cavities and thus no tendency of product to cling to the cavity surfaces when the product-filled sections are moved apart. Thus, when the mold is opened, the charge therein may be readily ejected. Usually it is desirable to immerse the mold in warm water before use thereof so as to further decrease any possibility of adherence of the product to the mold surfaces. In order to permit more effective warming of the mold members, the walls of the sections are made relatively thick except adjacent the edges 17 and the apertures 21. It is furthermore desirable in this connection to form the mold of aluminum or the like in order that the heat may be more effectively retained therein.

What is claimed is:

1. A mold of the character described comprising a pair of mold sections having opposed mold cavities with confronting openings, each of said openings being defined by a rim at the front of the sections and with all portions of each rim lying in a common plane, a handle element secured to each of said sections and spaced inwardly from the front and rear thereof, each handle having an offset manual engaging portion disposed in general alignment with the other of the mold sections, means pivotally securing said handle elements together for movement to effect selective opening and closing of said mold sections, said rims arranged to contact each other in substantially sealing engagement when the sections are in closed position, and each of said mold sections having an opening therethrough spaced from said confronting openings and having an axis disposed substantially normal to the plane of the rim thereof.

2. A device for scooping, compressing and molding ground meat products and the like comprising a pair of mold sections with walls of substantially semi-spherical form providing opposed mold cavities with confronting openings defined by continuous circular edges, handle members pivotally connected together and secured to said sections operable to move said sections to a closed position in which said edges will be in substantially sealing engagement or to an open position in which said edges will be spaced for reception of a product into the respective mold cavities, said walls being reduced to substantially knife-like thickness at said edges to provide a shearing action upon closing of the sections, and air venting means in the form of openings at the base of each of said cavities having a cross-sectional area several times less than that of the aforesaid openings to the cavities, said walls being reduced in thickness at said vent openings to form a flat unobstructed area surrounding such openings, and said walls being cylindrical and concentric on the exterior thereof adjacent said edges.

3. A device as set forth in claim 2 in which each of said openings has a diameter substantially one-fourth the diameter of said mold cavity openings.

4. A device for scooping, compressing and molding ground meat products and the like comprising a pair of mold sections with walls of substantially semi-spherical form providing opposed mold cavities with confronting openings defined by continuous circular edges, handle members pivotally connected together and secured to said sections operable to move said sections to a closed position in which said edges will be in substantially sealing engagement or to an open position in which said edges will be spaced for reception of a product into the respective mold cavities, said circular edges being knife-like to provide a shearing action upon closing of the sections, and air venting means in the form of openings at the base of each of said cavities having a cross-sectional area several times less than that of the aforesaid openings to the cavities, and the openings at the base of each of said cavities being concentric to the axis of the sections lying normal to the plane containing the cutting edges.

References Cited in the file of this patent

UNITED STATES PATENTS

| | | |
|---|---|---|
| D. 100,705 | Little | Aug. 4, 1936 |
| 46,319 | Allen | Feb. 14, 1865 |
| 141,882 | May | Aug. 19, 1873 |
| 1,639,122 | Whitman | Aug. 16, 1927 |
| 2,003,197 | Jackson | May 28, 1935 |
| 2,785,641 | Wosse | Mar. 19, 1957 |

FOREIGN PATENTS

| | | |
|---|---|---|
| 218,836 | Germany | Feb. 11, 1910 |